(12) United States Patent
Yao et al.

(10) Patent No.: US 9,014,376 B2
(45) Date of Patent: Apr. 21, 2015

(54) METHOD AND APPARATUS FOR LOW-POWER AP-ASSISTED FAST WIRELESS ROAMING USING OPTIMIZED NEIGHBOR GRAPHS

(75) Inventors: Zongming Yao, Shanghai (CN); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 12/383,204

(22) Filed: Mar. 19, 2009

(65) Prior Publication Data

US 2010/0241854 A1 Sep. 23, 2010

(51) Int. Cl.
| | | |
|---|---|---|
| H04L 9/08 | (2006.01) | |
| H04L 29/06 | (2006.01) | |
| H04W 12/06 | (2009.01) | |
| H04W 36/00 | (2009.01) | |
| H04W 12/04 | (2009.01) | |
| H04W 84/12 | (2009.01) | |
| H04W 88/08 | (2009.01) | |

(52) U.S. Cl.
CPC ............... *H04L 9/0844* (2013.01); *H04L 9/08* (2013.01); *H04L 63/061* (2013.01); *H04W 12/04* (2013.01); *H04W 12/06* (2013.01); *H04W 36/0016* (2013.01); *H04W 84/12* (2013.01); *H04W 88/08* (2013.01); *H04L 2209/80* (2013.01)

(58) Field of Classification Search
CPC ............ H04L 9/00; H04L 9/08; H04L 9/0891
USPC .......................................... 380/270, 272, 273
See application file for complete search history.

(56) References Cited

U.S. PATENT DOCUMENTS

| | | | |
|---|---|---|---|
| 2001/0041594 A1 | 11/2001 | Arazi et al. | |
| 2004/0242228 A1* | 12/2004 | Lee et al. | |
| 2005/0176429 A1 | 8/2005 | Lee et al. | |
| 2006/0092883 A1* | 5/2006 | Lee et al. | |
| 2006/0256763 A1* | 11/2006 | Nguyen et al. | |
| 2007/0041344 A1* | 2/2007 | Yaqub et al. ................... | 370/331 |
| 2007/0280152 A1* | 12/2007 | Thomson et al. | |
| 2008/0031194 A1* | 2/2008 | Yaqub ........................... | 370/331 |
| 2008/0107080 A1* | 5/2008 | Tsai .............................. | 370/331 |

FOREIGN PATENT DOCUMENTS

| | | |
|---|---|---|
| JP | 2004-222300 A | 8/2004 |
| JP | 2006-339925 A | 12/2006 |
| KR | 10-2005-0114186 A | 12/2005 |
| KR | 10-2006-0126889 A | 12/2006 |
| WO | 2010/107574 A2 | 9/2010 |
| WO | 2010/107574 A3 | 1/2011 |

OTHER PUBLICATIONS

International Search Report and Written Opinion on Patentability for PCT Patent Application No. PCT/US2010/025901, mailed on Oct. 15, 2010, 9 pages.

(Continued)

*Primary Examiner* — Ellen Tran
(74) *Attorney, Agent, or Firm* — Ellis B. Ramirez; PRASS LLP

(57) ABSTRACT

An embodiment of the present invention provides a method, comprising using optimized neighbor graphs for low-power access point assisted fast wireless roaming by a wireless station (STA) operating in a wireless network.

21 Claims, 7 Drawing Sheets

(56) References Cited

OTHER PUBLICATIONS

Notice of Allowance received for Korean Patent Application No. 10-2011-7021888, mailed on Jan. 23, 2014, 1 Page of English Translation and 2 pages of Korean Notice of Allowance.
Office Action received for Chinese Patent Application No. 201010145552.3, mailed on Jan. 3, 2014, 4 Pages of English Translation and 3 pages of Chinese Office Action.
International Preliminary Report on Patentability Received for PCT Patent Application No. PCT/US2010/025901, mailed on Sep. 29, 2011, 8 pages.
Tateno et al., "Fast handoff to reduce probe latency in wireless LANs", Technical Report of the Institute of Image Information and Television Engineers, Jul. 23, 2008, vol. 32, No. 30, pp. 69-74.
Office Action Received for Japanese Patent Application No. 2011-554080, mailed on Feb. 12, 2013, 2 Pages of Office Action & 2 pages of English Translation.
Office Action received in Chinese Patent Application No. 201010145552.3, mailed Sep. 3, 2012, 10 pages of Office Action, including 4 pages of English translation.
Office Action Received for Chinese Patent Application No. 201010145552.3, mailed on Apr. 3, 2013, 3 pages of Office Action and 6 pages of English Translation.
Office Action received for Chinese Patent Application No. 201010145552.3, mailed on Aug. 19, 2013, 4 pages of Office Action and 6 pages of English Translation.
Office Action received for Japanese Patent Application No. 2011-554080, mailed on Aug. 27, 2013, 2 pages of Office Action and 2 pages of English Translation.
Office Action Received for Korean Patent Application No. 2011-7021888, mailed on May 21, 2013, 3 pages of English Translation only.
Office Action received for Korean Patent Application No. 2011-7021888, mailed on Nov. 28, 2013, 2 pages of English Translation only.
Office Action received for Chinese Patent Application No. 201010145552.3, mailed on May 30, 2014, 5 page of English Translation and 3 pages of Office Action.
Notice of Allowance received for Japanese Patent Application No. 2011-554080, mailed on Jan. 21, 2014, 3 pages of NOA only.

* cited by examiner

ENHANCED 802.11R INITIAL MOBILITY DOMAIN ASSOCIATION

//<br>
METHOD AND APPARATUS FOR LOW-POWER AP-ASSISTED FAST WIRELESS ROAMING USING OPTIMIZED NEIGHBOR GRAPHS

BACKGROUND

Quality of Service (QoS) of applications such as, but not limited to, voice over Internet Protocol (VoIP), video conferencing etc. in enterprise wireless local area networks (WLAN) depend on seamless fast transitions. This is true whether they are between different access points (APs) belonging to same PHY technology (e.g. 'a'↔'a', or, 'b' ↔'b'), or to newer usages requiring inter-PHY (e.g. 'a' band ↔ 'n', or, 'b'↔'n') transitions. Very little design attention has been given to the inter-PHY transitions and thus, a strong need exists for methods and apparatus for improved inter-PHY transitions to enable fast wireless roaming in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
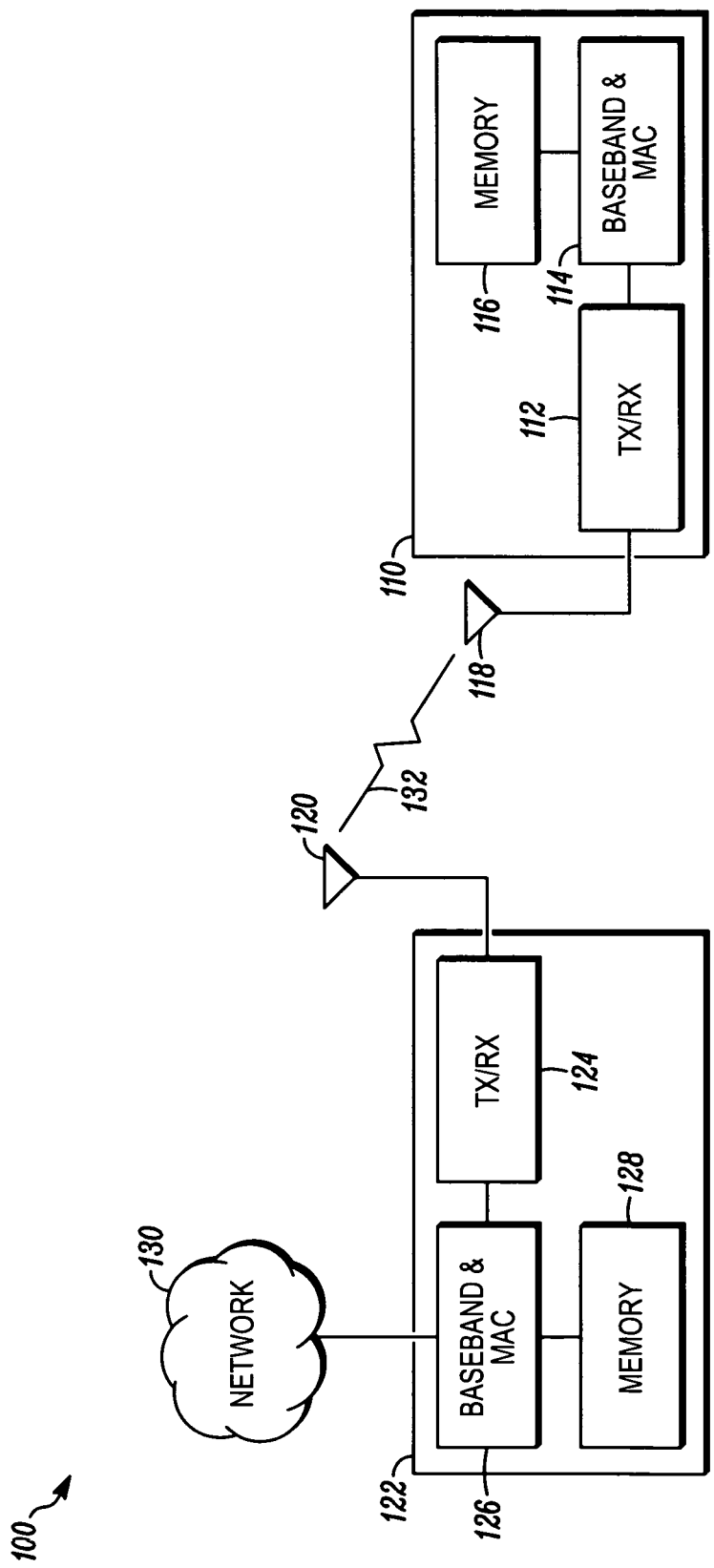
FIG. 1 is a diagram of a wireless local area network communication system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art. In some embodiments, such algorithms and data processing may include analog processing at baseband frequencies, intermediate-frequencies (IF), or radio-frequencies (RF) implemented at least in part in hardware, in software, or in a combination thereof, although the scope of the invention is not limited in this respect.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 (also referred to herein as a wireless station (STA) or "client") may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect. Mobile unit 110 may communicate with access point 122 via wireless communication link 132, where access point 122 may include at least one antenna 120. In an alternative embodiment, access point 122 and optionally mobile unit 110 may include two or more antennas. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, IEEE 802.11g, IEEE 802.11n, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Embodiments of the present invention provide design and protocol enhancements to those defined in the IEEE-80211r-2008 standard, although the present invention is not limited in this respect or to any particular standard. These standard protocols are highly inefficient, because every time when roaming to the target AP, the client (also may be referred to herein as wireless station (STA) or mobile unit) needs to exchange 11r-authentication messages with the target AP so as to re-calculate PTK. This may cost on some APs (although not limited in this respect) a few milliseconds which is accountable for seamless Fast Transition. Existing methods of transition require a client to scan every single time that it needs to roam. This is bad for transition time and also very bad for device power. Embodiments of the present invention enable lower power consumption by mobile units during roam time and speed up roam-time by reducing time taken by clients to scan and select a new AP.

When the client is associated with the AP, and when it gets a neighbor graph from that AP, then, it does not need to perform scans. Not having to perform scans has very good power benefits and also eliminates scan-time which is a wasted time for transitions.

Although not limited in this respect, embodiments of the present invention enable the use of pre-derived PTK for re-association when roaming happens, thus the present invention can save on some APs for example, but not limited to, a few, such as, 15~20 milliseconds, for exchanging 11r-authentication messages. Further, both the enhanced Neighbor Report messages and 11r-authentication with neighbor APs so as to get PTK in advance will not affect the secure communication between the client and the associated AP, thus will not block the normal data traffic between the client and the associated AP.

Although embodiments of the present invention may be described in terms of the Institute for Electronic and Electrical Engineers (IEEE) 802.11 standard, it is understood that the present invention is not limited to 802.11 and may be used also in additional wireless technologies such as, but not limited to, 802.16 and 802.21.

802.11r is an amendment to the 802.11 standard to permit continuous connectivity to wireless devices in motion, with fast and secure handoffs from one AP to another managed in a seamless manner. Embodiments of the present invention provide an enhanced seamless fast transition mechanism over and above that described in the IEEE 802.11r standard, which is also applicable to inter-PHY technology handoffs.

Looking now at FIGS. 2A and 2B, generally shown as 200, are illustrations of the current mechanism of 802.11r over-the-DS fast transition in the RSN, and works as follows:

1. In the fast BSS transition mechanism, the fast BSS transition protocol needs the initial information exchange during the first association between client 210 and AP 220.

Such initial exchange is referred to as the fast basic service set (BSS) transition initial mobility domain association protocol.

2. Subsequent reassociations to APs within the same Mobility Domain (A mobility domain is defined as the set of BSSs that are within the same extended service set (ESS) and support the fast BSS transition protocol) may perform the fast BSS Transition protocol.

It is noted that that: 1. The 11r-authentication request is transmitted to the target AP 250 through the current AP 240, and the 11r-authentication response is transmitted back to the client 230 through the current AP 240; 2. Rather than in data frames, both 11r-authentication request and response are encapsulated in action frames; 3. Client 230 communicates with APs through the enterprise wireless LAN, while APs communicate with each other through the enterprise wired LAN.

Figure 2A:
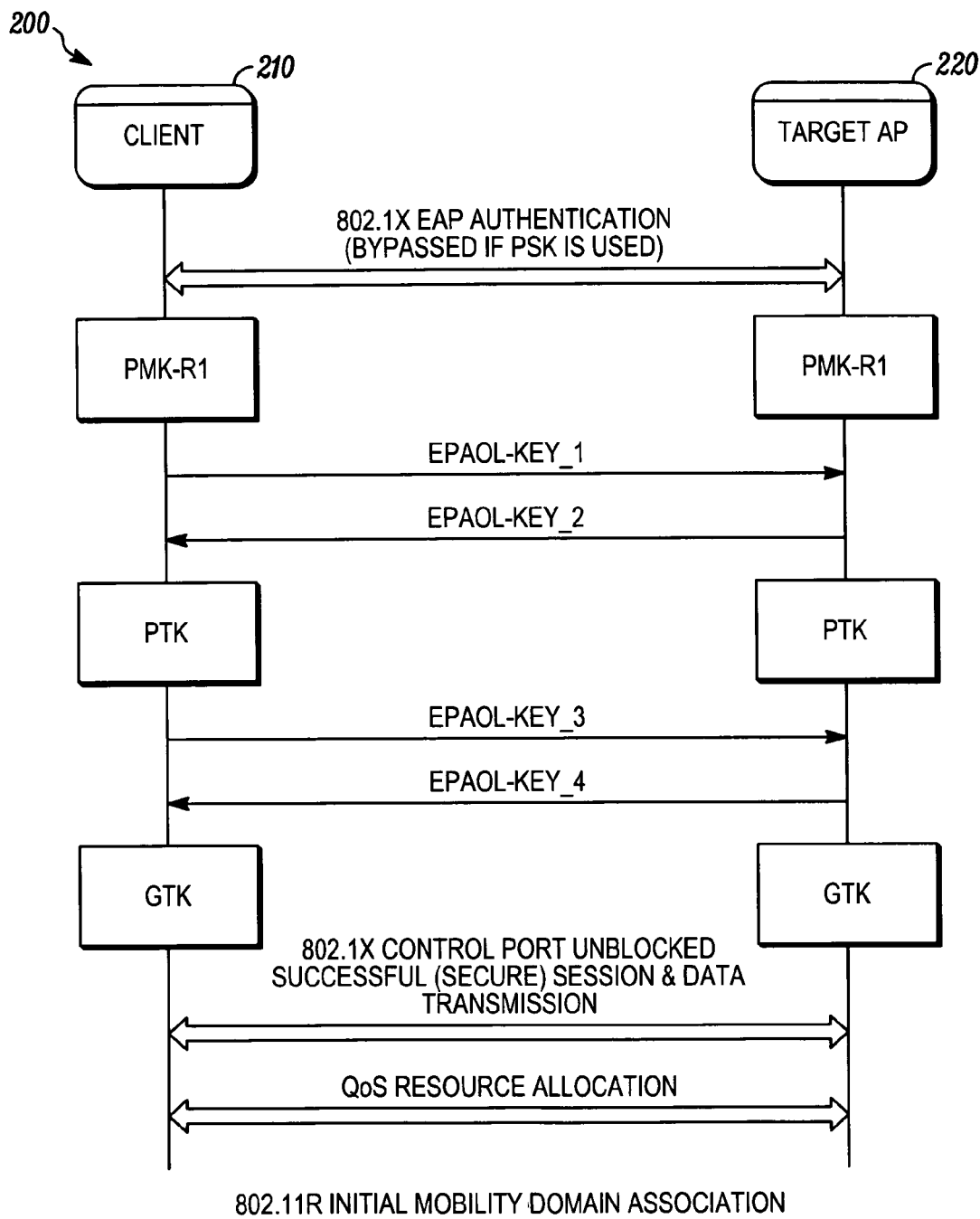
FIGS. 2A and 2B depict an 802.11r over-the-DS Fast Transition in a robust secure network (RSN)
Figure 2B:
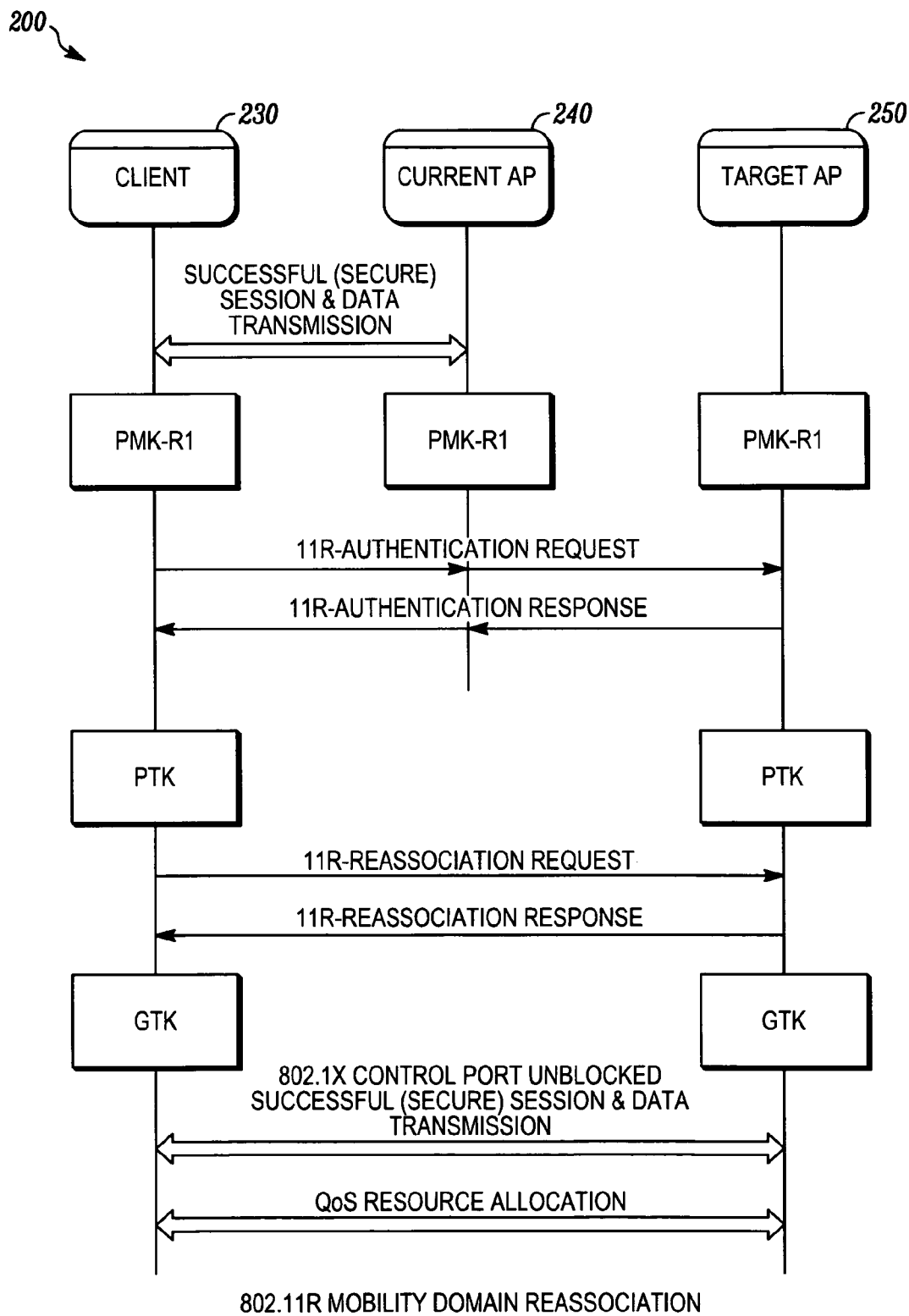

However, the 80211r Fast Transition process shown in FIGS. 2A and 2B is insufficient, because every time when roaming to the target AP 220 and 250, the client 210 and 230 needs to exchange 11r-authentication messages (11r-authentication request and 11r-authentication response) with the target AP 220 and 250 so as to re-calculate PTK. And, as mentioned above, this may cost several milliseconds during critical roam-time, which may impact voice calls during Fast Transition, which have a sub 50 msec L2 roaming budget. Therefore, reducing this latency is of utmost importance for secure and seamless Fast Transition.

Figure 3:
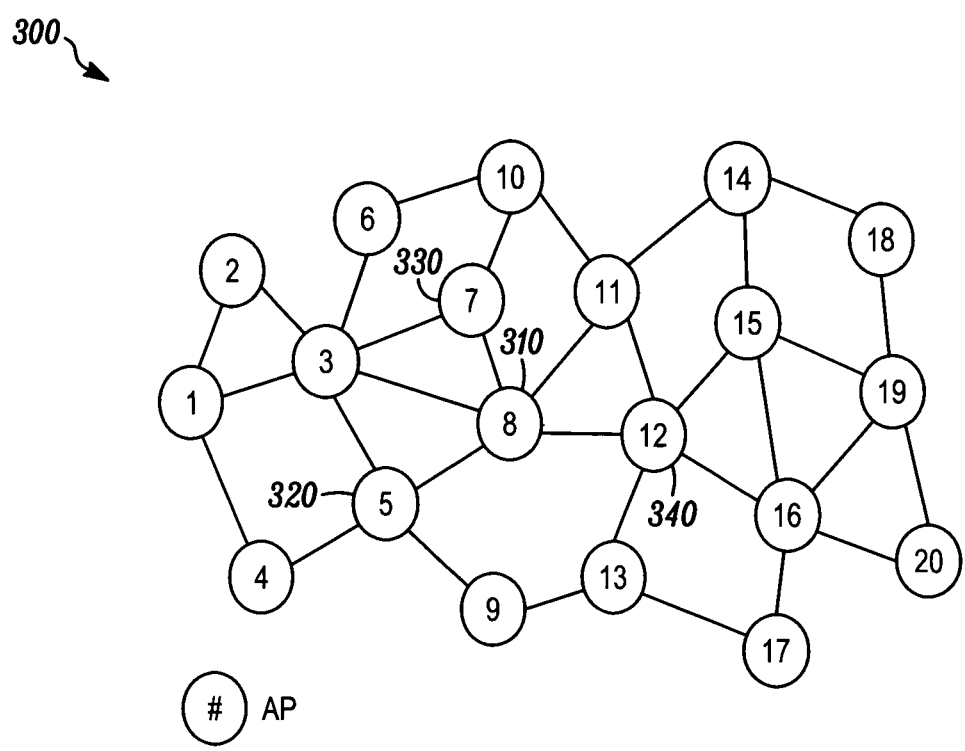
FIG. 3. illustrates a typical neighbor graph of an Enterprise wireless local area network (WLAN)

Looking now at FIG. 3, shown generally as 300, is an illustration of the typical neighbor graph of the enterprise WLAN deployment of an embodiment of the present invention. The neighbor graph is depicted by using the measurement results of each AP in the enterprise WLAN. The neighbor graph could be dynamically changed due to the change of the enterprise environments, e.g. Channel re-assignment of APs by the WLAN Controller. The IEEE 802.11k group has defined mechanisms for clients to report such measurements in enterprise WLAN, and most APs support this, as well. So, the present invention may facilitate 802.11r Fast Transition by using the results of such kind of measurement. Measurements derived by actively asking for the current AP's neighbors and performing 11r-authentication with those neighbors so as to derive PTK in advance. However, by using the current 802.11k Neighbor Report mechanism, the client can only get a limited number of APs to perform 11r-authentication in advance. E.g., if the client is currently associated with AP8 310, by using the current 802.11k Neighbor Report mechanism, the client can only get AP5 320, AP7 330 and AP12 340 to perform 11r-authentication exchange in advance. This is not good when a client is moving around, as the client needs to get multiple neighbor reports and then do 11r-authentications.

Having a broader network topology will ensure clients have done 11r-authentications with those APs, and that it does not need to get multiple neighbor reports, and then do 11r-auths. Thus, embodiments of the present invention enhance the current 802.11k Neighbor Report mechanism: instead of only getting a limited number of neighbor APs, the clients will get the entire WLAN AP network topology; in other words, the clients will get all those APs (except the current associated AP) that appears in FIG. 3 through the enhanced 802.11k neighbor report mechanism.

Figure 4:
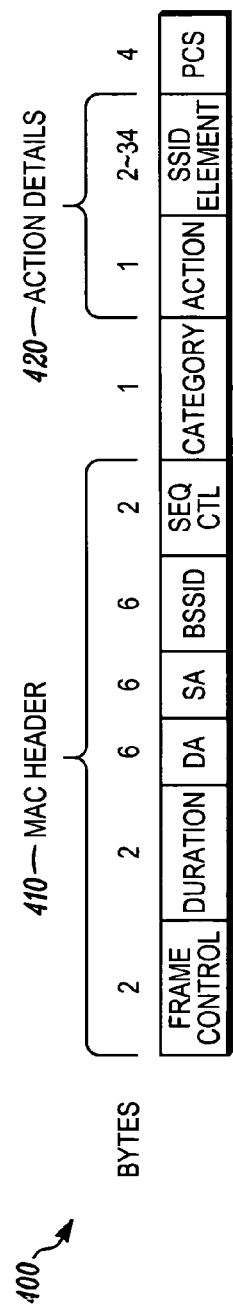
FIG. 4 shows an enhanced Institute for Electronic and Electrical Engineers (IEEE) 802.11k neighbor report request frame format of embodiments of the present invention.

FIG. 4 at 400 shows the proposed frame format for the enhanced 802.11k neighbor report request of an embodiment of the present invention. MAC header is illustrated at 410 and Action details at 420. It is noted that the Category should be configured to represent that this is a request to get the entire WLAN AP network topology and the SSID should also be configured so as to get those APs who belongs to the same ESS.

Figure 5:
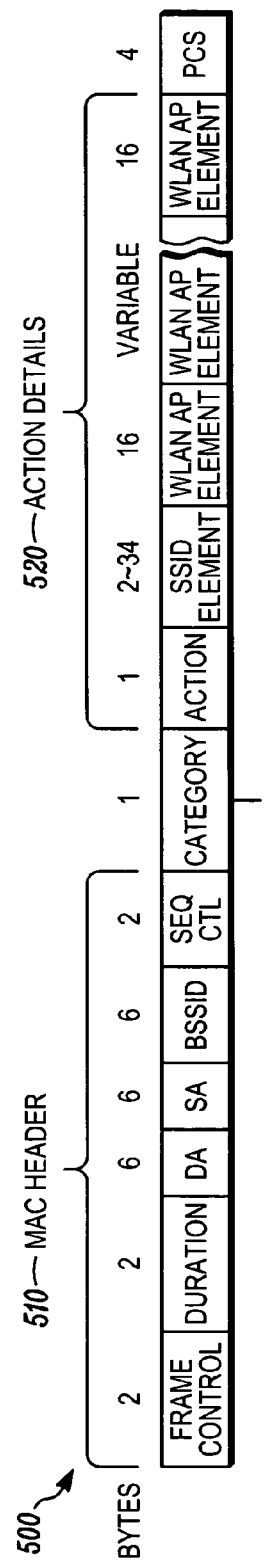
FIG. 5 depicts an enhanced IEEE 802.11k neighbor report response frame format of embodiments of the present invention.

FIG. 5 at 500 illustrates the proposed frame format for the enhanced 802.11k neighbor report response of embodiments of the present invention. MAC header is illustrated at 510 and Action details at 520. In addition to configuring both the Category and the SSID, the WLAN AP elements should also be included in this response; and all of the returned WLAN APs should belong to the same ESS which is specified by the SSID.

Figure 6:
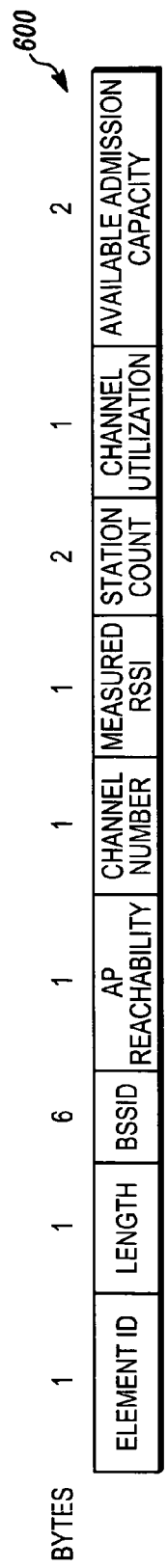
FIG. 6 depicts WLAN AP element contents of embodiments of the present invention.

FIG. 6 at 600 shows a proposed format for the WLAN AP element of embodiments of the present invention. Note that:

1. Element ID should have the value that has not been used by any other existing elements;
2. Length should equal to 14, which is just the size of the left areas;
3. BSSID is the MAC Address of the AP;
4. AP Reachability represents whether this AP could be reached by the STA through Wireless;
5. Channel Number is the current working channel of this AP;
6. Measured RSSI is the measured RSSI value and client could use it to check the signal strength with this AP;
7. Station Count tells the number of stations that are currently associating with this AP;
8. Channel Utilization is an integer between 0 and 255, which is defined as the percentage of time that this QoS AP sensed the medium was busy;
9. Available Admission Capacity contains the remaining amount of medium time available via explicit admission control. It is helpful for a mobile station to select a QoS AP that is likely to accept future admission control requests. The WLAN AP element is very important for the client, as the clients need to evaluate both the QoS and the signal strength before determining the best candidate AP for 802.11r fast transition.

Important novel aspects of embodiments of the present invention provide that the Client may use this AP-topology map from the network to perform 802.11r-authentication exchange with multiple APs. This allows a Client to derive PTKs (session keys for encryption) ahead of its AP-selection decision, increase association chances, and eliminate scanning. Some embodiments of the present invention also provide that Clients use such "primed" APs as more viable roaming candidates.

Embodiments of the present invention also reduce the hysteresis effect (when a client ping-pong between same two APs) on users, improving performance. Further, wireless roaming data suggests that the present invention may greatly reduce roam scanning. Reducing roam time scanning is a big power-save opportunity for handheld and laptop clients, although the present invention is not limited in this respect. Data also shows that AP-assisted roams reduce the number of association failures when the client does not have to "guess" the best AP only on scan results. Scan results can get obsolete by the time a complete scan is completed (1-2 mins)—a person can walk across 3 APs in this time.

Figure 7A:
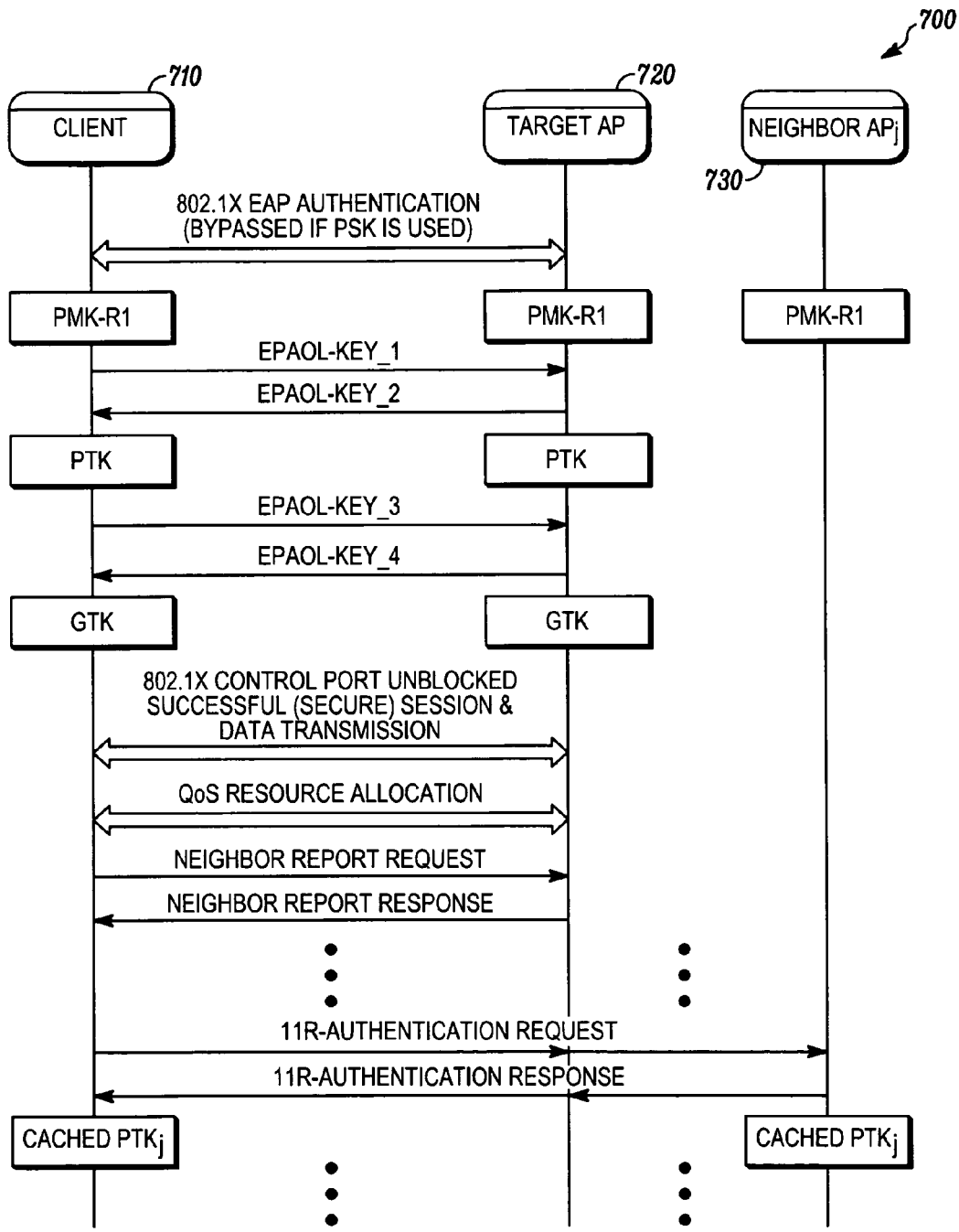
FIGS. 7A and 7B show an enhanced 802.11r over-the-DS Fast Transition in the RSN of embodiments of the present invention.
Figure 7B:
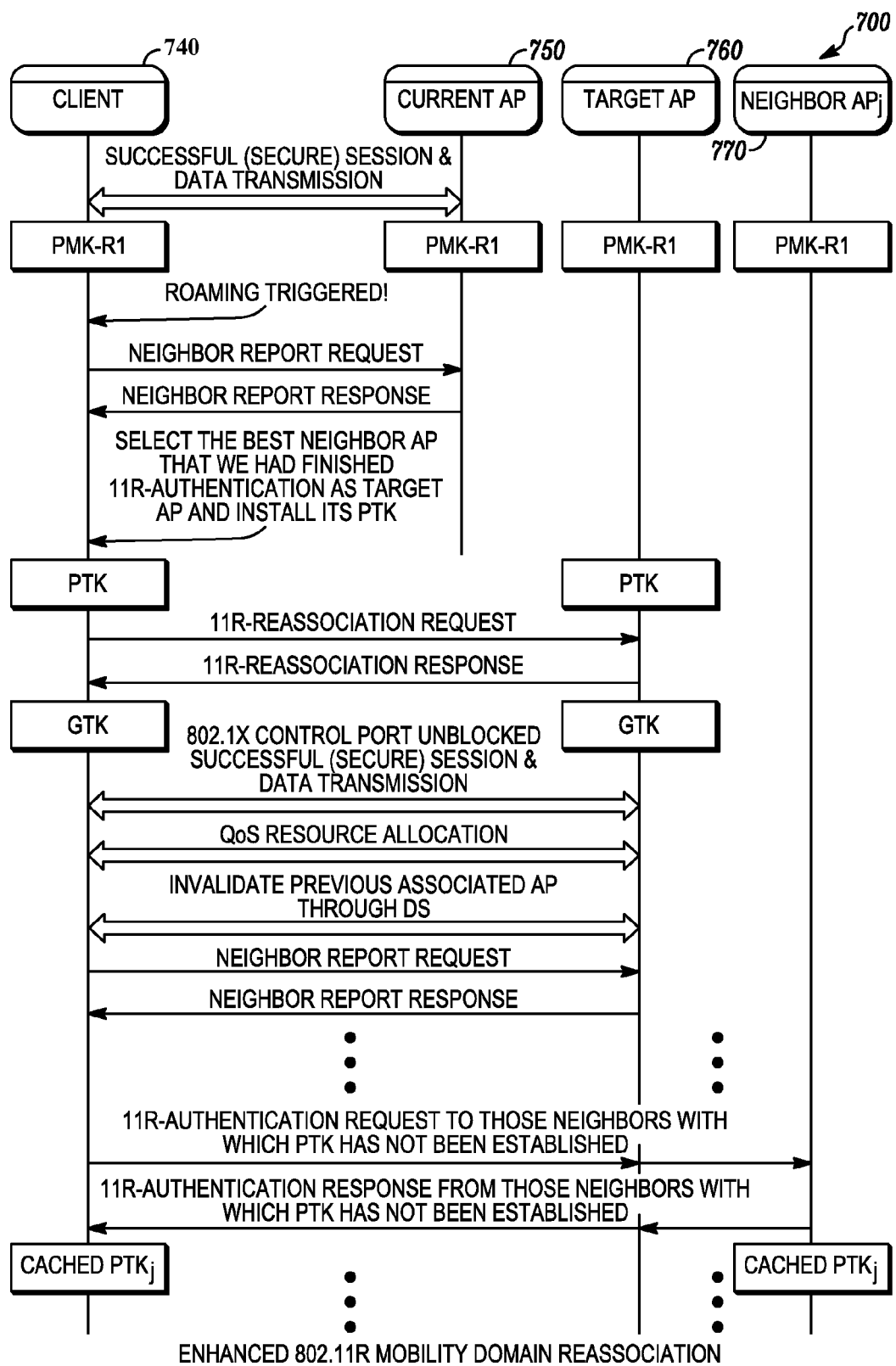

FIGS. 7A and 7B, shown generally as 700 depict the enhanced seamless fast transition mechanism of embodiments of the present invention. It works as follows:

1. When the client 710 enters the WLAN for the first time, it will perform full scanning to find an AP 720 and perform initial 802.11r association with it so as to connect with the WLAN.
2. Once the client 710 successfully associates with some AP 720, it will ask the associated AP 720 for its measured and maintained neighbor AP 730 topology graph. The present invention enables a client to use its location information to request a list of neighbor AP map.

3. Client 710 then performs 11r-authentication exchange (first 2 messages only), with all those 802.11r neighbor APs 730 and derive PTK (session keys) in advance; These session keys will have a long duration for KeyLifetime as PTK lifetime is bound to EAP KeyLifetime.

4. Roaming Trigger: After some time, a roaming might be generated within the client (normally by low RSSI) when the client moves away from the associated AP.

5. AP Selection: The client 740 will select out the best candidate based on the current neighbor AP 750 graph from associated AP. The AP selection algorithm will give preference to candidate APs with which the Client 740 has derived PTK in advance.

6. Once the client successfully roams to the new AP, it will continue to maintain a graph of all APs with which it has pre-established PTKs. Only the previous AP's PTK will be invalidated.

7. Client will request a fresh neighbor AP 770 graph measured and maintained by the newly associated AP 760. When the client 740 gets the new neighbor AP 770 list, it will perform 11r-authentication exchange and derive PTKs with all APs with which it does not already have a PTK established.

8. As an enhancement to the Client's hysteresis algorithm, the Client 740 will derive a new 11r-authentication and PTK with the last AP that it just left. This way if the client performs a ping-pong effect by roaming between 2 APs, then its adverse effects to users is minimized. The client will repeat step 2~step 8 when new 11r roaming is triggered at a later time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method, comprising:
   receiving at a wireless station (STA) an entire AP-topology map through a neighbor report mechanism from an associated AP;
   maintaining at the wireless station (STA) an optimized neighbor graphs of all APs with which the STA has pre-established session keys;
   providing at the STA a roaming trigger from a received signal strength (RSS), wherein after a period of time roaming may be triggered when the STA moves away from the associated AP;
   using the optimized neighbor graphs for access point (AP) assisted fast wireless roaming to associate with a new AP by the wireless station (STA) operating in a wireless network;
   requesting by said STA a fresh neighbor AP graph measured and maintained by a newly associated AP;
   invalidating by said STA once said STA successfully roams to the new AP only previous AP's session keys for pairwise security;
   maintaining by said STA once said STA successfully roams to the new AP a graph of all APs with which said STA has pre-established session keys for pairwise security.

2. The method of claim 1, wherein said STA uses the AP-topology map from said wireless network to perform an authentication exchange with multiple APs.

3. The method of claim 2, wherein said STA derives the session keys for pairwise security for encryption and authentication ahead of its AP-selection decision.

4. The method of claim 2, wherein said fast wireless roaming further comprises:
   performing a full or partial scan when said STA enters a wireless local area network (WLAN) to find an AP and perform an initial association with said AP so as to connect with said WLAN;
   asking the associated AP for its measured and maintained neighbor AP topology graph once said STA successfully associates with some AP;
   performing an authentication exchange by said STA with all neighbor APs;
   using the current AP for transmission, and deriving session keys for pairwise security in advance; and
   selecting by said STA the best candidate based on said neighbor AP graph from said associated AP.

5. The method of claim 1, wherein when said STA gets a the new neighbor AP list, it performs an authentication exchange and derive session keys for pairwise security with all APs with which it does not already have session keys for pairwise security established.

6. The method of claim 5, further comprising performing by said STA a new authentication exchange and deriving new session keys for pairwise security with a last AP that said STA just left.

7. The method of claim 2, wherein said authentication conforms to the Institute for Electronic and Electrical Engineers (IEEE) 802.11r or 802.16 standard.

8. An apparatus to enhance seamless fast transition, the apparatus comprising:
   a wireless station (STA) operable for communications in a wireless network using optimized neighbor graphs for access point (AP) assisted fast wireless roaming;
   providing at the STA a roaming trigger from a received signal strength (RSS), wherein after a period of time roaming may be triggered when the STA moves away from an associated AP;
   requesting by said STA a fresh neighbor AP graph measured and maintained by a newly associated AP;
   invalidating once said STA successfully roams to a new AP only previous AP's session keys for pairwise security;
   maintaining once said STA successfully roams to the new AP a graph of all APs with which said STA has pre-established session keys for pairwise security;
   wherein the wireless station (STA) maintains the optimized neighbor graphs of all APs with which the STA has pre-established session keys;
   wherein the wireless station (STA) receives an entire AP-topology map through a neighbor report mechanism from the associated AP.

9. The apparatus of claim 8, wherein said STA uses the AP-topology map from said wireless network to perform an authentication exchange with multiple APs.

10. The apparatus of claim 9, wherein said STA derives the session keys for pairwise security for encryption and authentication ahead of its AP-selection decision.

11. The apparatus of claim 9, wherein said fast wireless roaming further comprises:
   performing a full scan when said STA enters a wireless local area network (WLAN) to find an AP and perform an initial association with said AP so as to connect with said WLAN;
   asking the associated AP for its measured and maintained neighbor AP topology graph once said STA successfully associates with some AP;

performing an authentication exchange by said STA with all neighbor APs and deriving session keys for pairwise security in advance;

using the current AP for transmission, and deriving session keys for pairwise security in advance; and selecting by said STA the best candidate based on said neighbor AP graph from said associated AP.

12. The apparatus of claim 8, wherein when said STA receives a new neighbor AP list, it performs an authentication exchange and derives session keys for pairwise security with all APs with which it does not already have a session keys for pairwise security established.

13. The apparatus of claim 12, wherein said fast roaming further comprises deriving by said STA a new authentication and session keys for pairwise security with a last AP that said STA just left.

14. The apparatus of claim 9, wherein said authentication conforms to the Institute for Electronic and Electrical Engineers (IEEE) 802.11r or 802.16 standard.

15. A non-transitory article, comprising:
a computer readable medium encoded with computer executable instructions, that, when executed by a computing platform results in:
maintaining at a wireless station (STA) an optimized neighbor graphs of all APs with which the STA has pre-established session keys;
providing at the STA a roaming trigger from a received signal strength (RSS), wherein after a period of time roaming may be triggered when the STA moves away from an associated AP;
using the optimized neighbor graphs for access point assisted fast wireless roaming to associate with a new AP by a wireless station (STA) operating in a wireless network;
requesting by said STA a fresh neighbor AP graph measured and maintained by a newly associated AP;
invalidating by said STA once said STA successfully roams to the new AP only previous AP's session keys for pairwise security;
maintaining by said STA once said STA successfully roams to the new AP a graph of all APs with which said STA has pre-established session keys for pairwise security;

wherein the wireless station (STA) receives an entire AP-topology map through a neighbor report mechanism from the associated AP.

16. The non-transitory article of claim 15, wherein said STA uses the AP-topology map from said wireless network to perform an authentication exchange with multiple APs.

17. The non-transitory article of claim 16, wherein said STA derives session keys for pairwise security for encryption ahead of its AP-selection decision.

18. The non-transitory article of claim 16, wherein said fast wireless roaming further comprises:
performing a full scan when said STA enters a wireless local area network (WLAN) to find an AP and perform an initial association with said AP so as to connect with said WLAN;
asking the associated AP for its measured and maintained neighbor AP topology graph once said STA successfully associates with some AP;
performing an authentication exchange by said STA with all neighbor APs and derive session keys for pairwise security in advance;
using the current AP for transmission, and deriving session keys for pairwise security in advance; and
selecting by said STA the best candidate based on said neighbor AP graph from said associated AP.

19. The non-transitory article of claim 15, wherein when said STA gets a the new neighbor AP list, it performs an authentication exchange and derives session keys for pairwise security with all APs with which it does not already have session keys for pairwise security established.

20. The non-transitory article of claim 19, comprising further instructions, which when accessed cause a machine to perform further operations comprising, deriving by said STA a new authentication and session keys for pairwise security with a last AP that said STA just left.

21. The non-transitory article of claim 16, wherein said authentication conforms to the Institute for Electronic and Electrical Engineers (IEEE) 802.11r or 802.16 standard.

* * * * *